Nov. 5, 1957     E. E. SCHMIDT     2,811,802
ICE FISHING RIG
Filed July 20, 1956
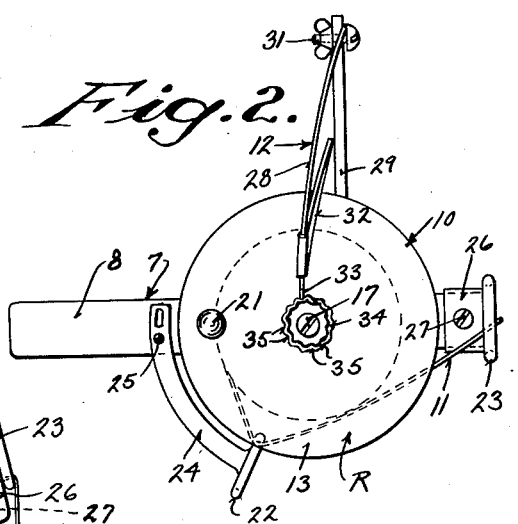
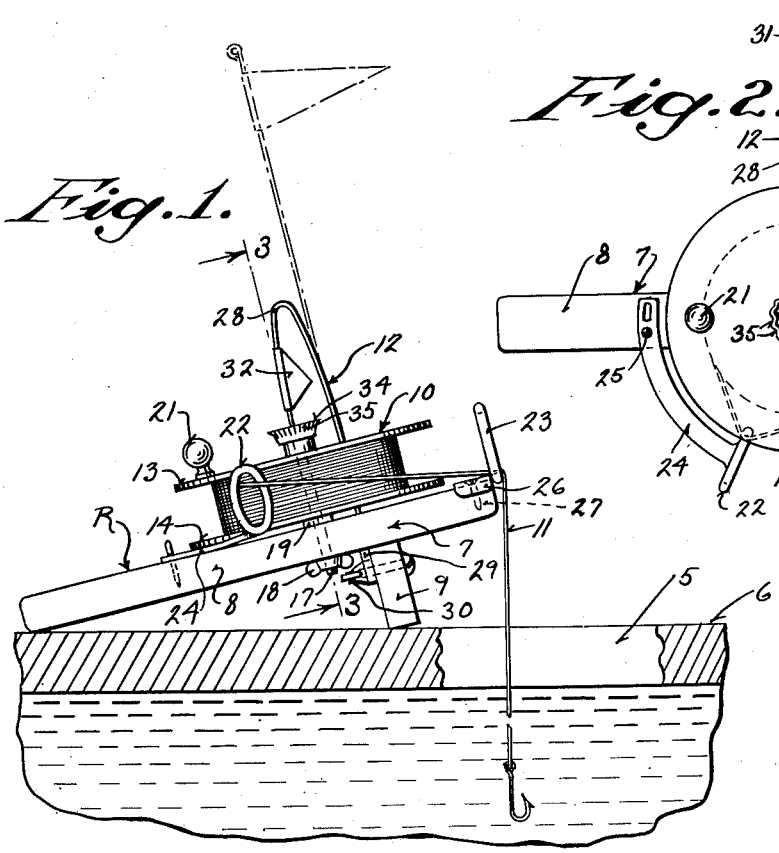
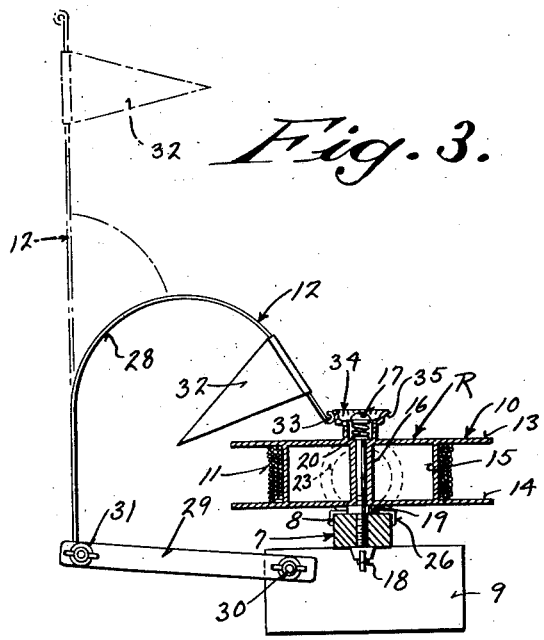
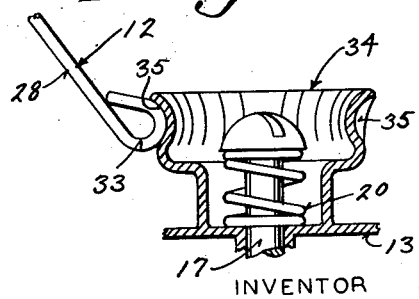
INVENTOR
EDWIN E. SCHMIDT
BY
*Young Wright*
ATTORNEYS

United States Patent Office 2,811,802
Patented Nov. 5, 1957

2,811,802

ICE FISHING RIG

Edwin E. Schmidt, Watertown, Wis.

Application July 20, 1956, Serial No. 599,128

1 Claim. (Cl. 43—17)

This invention appertains to an apparatus for fishing through ice and is of the type embodying a support for resting on the ice, a reel for the fishing line and a signal for indicating to the fisherman when a fish strikes the bait.

One of the primary objects of my invention is to provide an ice fishing rig embodying a novel support or frame for the reel and signal which can be readily seized and grasped in the hand for manipulation for hooking and landing the fish, whereby the handling of a wet, cold fishing line is obviated.

Another salient object of my invention is the provision of a sensitive signal which can be readily set to a non-signalling position and which will automatically spring to an operative signalling position upon the slightest rotation of the reel.

A further important object of my invention is the provision of a signal embodying a keeper head rotatable with the reel and having an annular row of keeper notches and a resilient staff carrying a signal flag adapted to be flexed from its normal vertical signalling position to a lowered non-signalling position over the reel with its terminal fitted in a keeper notch so that the staff extends substantially radially to the head and reel and whereby upon the turning of the reel and head, the staff will be flexed to a position substantially tangential to the head and out of the keeper notch.

A further important object of my invention is the provision of means whereby the staff can be folded to a collapsed position under the reel and alongside of the frame for facilitating the transporting of the rig.

A still further object of my invention is the provision of novel means for mounting the reel and guide eyes for the line on the frame or support, so that the line can be freely wound on the reel or paid off therefrom.

A still further object of my invention is to provide a fishing rig of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described and claimed, and illustrated in the accompanying drawing, in which drawing, Figure 1 is a side elevational view of my improved fishing rig showing the same in use and with the signal flag in its set non-signalling position in full lines and in its raised signalling position in dotted lines;

Figure 2 is a top plan view of the fishing rig;

Figure 3 is a transverse sectional view through the fishing rig taken on the line 3—3 of Figure 1, looking in the direction of the arrows, and Figure 4 is an enlarged detail fragmentary vertical sectional view showing the novel formation of the keeper head with the signal staff in its lowered latched position.

Referring to the drawing in detail, wherein similar reference characters designate corresponding parts throughout the several views, the letter R generally indicates my novel rig for facilitating the fishing through an opening 5 in a sheet of ice 6 covering a body of water.

The rig R comprises a light but sturdy base frame or support 7 and this frame 7 includes a longitudinally extending bar 8 preferably formed from wood. Rigidly secured to the lower face of the bar 8 adjacent to, but spaced from the forward end thereof, is a transversely extending rest bar 9 also preferably formed of wood. This base frame or support rotatably carries a reel 10 for a fish line 11 and a signal 12, and the reel 10 and signal 12 will now be described.

The reel 10 is formed from light sheet metal and includes a pair of disc shaped end plates 13 and 14 having a hub 15 confined therebetween. An axially disposed hub sleeve 16 is also provided and this hub sleeve is rotatably mounted upon a bolt 17 which extends through the forward end of the bar 8. In actual practice, the bolt 17 extends entirely through the bar and the lower end of the bolt has threaded thereon a winged nut 18 so that the reel can be quickly removed from the base frame or connected therewith. A wear washer 19 is interposed between the bar 8 and the reel. It is also preferred to mount an expansion coil spring 20 on the bolt and confine the spring between the head of the bolt and the reel whereby the reel will be held against accidental and too free rotation.

The line 11 is of course wound upon the hub 15 and the upper plate 13 of the reel is provided with a handle 21 to facilitate the rotation of the reel and the winding up of the line thereon.

Means is provided for facilitating the guiding of the line on and off the reel and to position the free end of the line at the end of the bar 8. Thus, inner and outer guide eyes 22 and 23 are provided. The eyes are of a considerable diameter so as to not hamper the passage of an ice encrusted line therethrough. The eye 22 is disposed at one side of the reel and is mounted on the outer terminal of an arcuate arm 24 which extends over the bar 8 in rear of the reel. This arm 24 is secured to the bar 8 in any preferred manner, such as by the use of a screw 25. The eye 23 is arranged at the extreme forward end of the bar and is mounted on a bracket 26 which is positioned over the upper face of the bar and functions as a protector therefor. This bracket 26 can be secured to the bar 8 by means of a screw 27.

Now referring to the signal 12, the same embodies a resilient staff 28 and the staff can be formed from steel wire of the desired gauge. The lower end of this wire is carried by a laterally extending bracket arm 29 and this bracket arm 29 is carried by the cross bar 9 through the medium of a bolt 30. The bolt 30 is preferably of the quick detachable type, so that the bracket arm can be removed in its entirety should such be desired. The outer end of the bracket arm carries an adjustable bolt 31 and this bolt is employed for holding the resilient staff 28 to the arm. By loosening this bolt 31 the resilient staff can be folded down and flexed under the reel in close relationship to the bar 9. A flag 32 or similar signal device is carried by the staff 28 adjacent to its upper end so that when the staff is in its normal upright position this flag can be easily seen by the fisherman. The extreme upper end of the staff terminates in a bent back eye 33 which constitutes a latch and this latch cooperates with a keeper head 34. The keeper head 34 forms an important feature of this invention and is rigidly connected to the reel adjacent to the axial center of the reel and hence rotates with the reel. The keeper head 34 is preferably of a hollow construction and surrounds the upper end of the bolt 17 so as to form a protection for the head of the bolt. Hence the keeper head is of a circular shape and the extreme upper end thereof is provided with an annular row of keeper notches 35.

In use of my fishing rig, the same is placed on the ice adjacent to the opening 5 with the bar 9 resting on the ice and the outer end of the bar 8 resting on the ice. Thus, the bar 8 is disposed at an angle to the ice and is spaced at all points therefrom with the exception of the extreme inner end thereof. The hook carried by the line is baited in the usual manner and the line is paid off of the reel a desired distance. After this is completed, the staff 28 is flexed against its inherent resiliency over the reel and the latch eye 33 is placed in the nearest keeper notch 35. Thus, the resilient staff 28 will extend substantially radially from the keeper head and will be held in a bowed, lowered position. When a fish strikes the bait, the reel will be turned and the staff will be flexed laterally toward a position tangential of the keeper head and the keeper notch will move away from the staff and the staff will automatically spring back to its normal vertical signalling position. Only a slight turning movement of the reel is necessary to release the staff and thus the signal is of an extremely sensitive nature.

When a fish strikes and the signal flag moves to its vertical signalling position, the fisherman reaches down and grasps the bar 8 and uses the same as a handle and the entire rig can be manipulated to facilitate the hooking of the fish and the landing of the fish.

Changes in details may be made without departing from the spirit or the scope of this invention but what I claim as new is:

A fishing rig comprising a base frame, a holding bolt rigidly mounted on the base frame and extending upwardly therefrom, a reel having an axially disposed hub sleeve rotatably mounted on the bolt for supporting the reel, spring means coiled around the bolt and confined between the bolt head and the reel for exerting tension on said reel to prevent accidental rotation thereof, a resilient signal staff carried by the base frame adapted to normally extend in a vertical signalling position, a signalling member carried by the upper end of the staff, said staff terminating at its upper end in a latch eye, and a keeper head rigidly secured to the reel for rotation therewith and surrounding the head of the bolt and the tension spring, said keeper head having an annular row of keeper notches, said staff being adapted to be flexed over the reel to a lowered non-signalling position with the latch eye hooked in one of said keeper notches.

References Cited in the file of this patent
UNITED STATES PATENTS

| | | |
|---|---|---|
| 1,621,017 | Joyal | Mar. 15, 1927 |
| 1,741,253 | Skelton | Dec. 31, 1929 |
| 2,624,972 | Burg | Jan. 13, 1953 |
| 2,732,649 | Tuttle | Jan. 31, 1956 |